US010214644B2

(12) United States Patent
van de Wetering et al.

(10) Patent No.: US 10,214,644 B2
(45) **Date of Patent: *Feb. 26, 2019**

(54) DARK POLYCARBONATE COMPOSITION

(71) Applicant: SABIC Global Technologies B.V., Bergen op Zoom (NL)

(72) Inventors: Karin van de Wetering, Bergen op Zoom (NL); Robert van de Grampel, Tholen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 197 days.

This patent is subject to a terminal disclaimer.

(21) Appl. No.: 14/313,112

(22) Filed: Jun. 24, 2014

(65) Prior Publication Data

US 2015/0005423 A1 Jan. 1, 2015

Related U.S. Application Data

(60) Provisional application No. 61/839,591, filed on Jun. 26, 2013.

(51) Int. Cl.

| | |
|---|---|
| ***C08L 69/00*** | (2006.01) |
| ***C08K 3/04*** | (2006.01) |
| ***C08K 3/22*** | (2006.01) |
| ***C08K 5/00*** | (2006.01) |
| ***C08L 83/10*** | (2006.01) |

(52) U.S. Cl.

CPC ................ *C08L 69/00* (2013.01); *C08K 3/04* (2013.01); *C08K 3/22* (2013.01); *C08K 5/0066* (2013.01); *C08L 83/10* (2013.01)

(58) Field of Classification Search

CPC ........... C08L 69/00; C08L 83/10; C08K 3/04; C08K 3/22; C08K 5/0066

USPC .......................................................... 524/165

See application file for complete search history.

(56) References Cited

U.S. PATENT DOCUMENTS

| | | | | |
|---|---|---|---|---|
| 4,923,933 | A | 5/1990 | Curry | |
| 5,137,949 | A | 8/1992 | Paul et al. | |
| 5,391,600 | A | 2/1995 | Umeda et al. | |
| 5,451,632 | A | 9/1995 | Okumura et al. | |
| 5,502,134 | A | 3/1996 | Okamoto et al. | |
| 6,001,929 | A | 12/1999 | Nodera et al. | |
| 6,031,036 | A | 2/2000 | Rosenquist et al. | |
| 6,822,041 | B2 | 11/2004 | Schottland et al. | |
| 8,674,008 | B2 | 3/2014 | Van De Wetering et al. | |
| 8,703,855 | B2 | 4/2014 | Van De Wetering et al. | |
| 8,703,856 | B2 | 4/2014 | Van De Wetering et al. | |
| 8,981,015 | B2 | 3/2015 | Sybert et al. | |
| 9,006,324 | B2 | 4/2015 | Sybert et al. | |
| 9,012,550 | B2 | 4/2015 | Sybert et al. | |
| 9,102,832 | B2 | 8/2015 | Sybert et al. | |
| 9,296,898 | B2 | 3/2016 | Sybert et al. | |
| 9,365,719 | B2 | 6/2016 | Sybert et al. | |
| 9,453,128 | B2 | 9/2016 | Sybert et al. | |
| 2005/0250882 | A1 | 11/2005 | Geprags | |
| 2006/0030664 | A1 | 2/2006 | Kim | |
| 2007/0129492 | A1 | 6/2007 | Colborn et al. | |
| 2007/0135569 | A1 | 6/2007 | Derudder | |
| 2008/0004937 | A1* | 1/2008 | Chow et al. | 705/10 |
| 2008/0230751 | A1* | 9/2008 | Li et al. | 252/582 |
| 2009/0036593 | A1* | 2/2009 | DeRudder et al. | 524/506 |
| 2009/0088514 | A1 | 4/2009 | Shiping | |
| 2010/0048779 | A1 | 2/2010 | Hayata | |
| 2010/0075125 | A1 | 3/2010 | Maas et al. | |
| 2011/0028615 | A1* | 2/2011 | Li et al. | 524/140 |
| 2011/0098386 | A1 | 4/2011 | Krauter et al. | |
| 2011/0207846 | A1 | 8/2011 | Monden | |
| 2012/0248384 | A1 | 10/2012 | van de Wetering et al. | |
| 2013/0085240 | A1 | 4/2013 | Sybert et al. | |
| 2013/0303672 | A1* | 11/2013 | Aoki | 524/166 |

FOREIGN PATENT DOCUMENTS

| | | | |
|---|---|---|---|
| CN | 101668799 | A | 3/2010 |
| CN | 101668799 | A | 3/2010 |
| CN | 101809085 | A | 8/2010 |
| CN | 101809085 | A | 8/2010 |
| CN | 102471569 | A | 5/2012 |
| CN | 102471569 | A | 5/2012 |
| DE | 102008054329 | A1 | 5/2010 |
| EP | 0524731 | A1 | 1/1993 |
| EP | 0899306 | A1 | 3/1999 |
| EP | 1555296 | B1 | 8/2010 |
| JP | 6145490 | A | 5/1994 |
| JP | 2010007897 | A | 1/1998 |
| JP | 2005290137 | A | 10/2005 |
| JP | 5320519 | A | 11/2005 |
| JP | 2012102179 | A | 5/2012 |
| JP | 2012153824 | A | 8/2012 |
| WO | WO 2005/037921 | A1 | 4/2005 |

(Continued)

OTHER PUBLICATIONS

Lexan 143R Data Sheet. 2011.*
Durotuff. PC Tube & Other Product. Dec. 2, 2011.*
Lexan HF1140 Data Sheet. Mar. 31, 2000.*
Lexan 123 Data Sheet. Feb. 27, 2008.*
Lexan 940A Data Sheet. Jun. 23, 2003.*
Lexan EXL Resin. 2008.*
International Search Report for PCT/IB2014/062545 dated Sep. 26, 2014.
Chinese Office Action for Chinese Patent Application No. 201480036698.0 dated Sep. 21, 2016 (with English translation).
European Office Action for European Patent Application No. 14 739 244.3 dated Feb. 9, 2017.
SABIC Innovative Plastics Purity+ Permformance Specialty Additives & Intermediates, 2013, pp. 1-20, www.sabic-ip.com.

(Continued)

*Primary Examiner* — John E Uselding
(74) *Attorney, Agent, or Firm* — Cantor Colburn LLP

(57) ABSTRACT

Polycarbonate blends with a combination of high thin wall flame retardance, low temperature ductility, and good tracking resistance are disclosed. The blends are a combination of a polycarbonate polymer, a polycarbonate-polysiloxane copolymer, non-brominated and non-chlorinated flame retardant, titanium dioxide, and carbon black.

20 Claims, No Drawings

(56) References Cited

FOREIGN PATENT DOCUMENTS

| | | | | |
|---|---|---|---|---|
| WO | WO 2007/098919 | * | 7/2007 | .............. B41M 5/26 |
| WO | 2008042491 | A1 | 4/2008 | |
| WO | WO 2010041550 | A1 | 4/2010 | |
| WO | WO 2010101041 | A1 | 9/2010 | |
| WO | WO 2011007673 | A1 | 1/2011 | |
| WO | WO 2011155490 | A1 | 12/2011 | |
| WO | WO 2012/063652 | A1 | 5/2012 | |
| WO | WO 2012063652 | A1 | 5/2012 | |

OTHER PUBLICATIONS

Written Opinion of the International Searching Authority for International Application No. PCT/US2011/060326; International Filing Date: Nov. 11, 2011; dated Feb. 8, 2012; 8 Pages.

* cited by examiner

DARK POLYCARBONATE COMPOSITION

This application claims priority to U.S. Provisional Patent Application Ser. No. 61/839,591, filed Jun. 26, 2013. That application is hereby incorporated by reference herein in its entirety.

BACKGROUND

The present disclosure relates to dark polycarbonate compositions that have a combination of low temperature impact resistance, thin wall flame retardance (FR), good electrical tracking resistance, and reduced halogen content. These polycarbonate compositions can be useful for various insulating applications.

Polycarbonates (PC) are synthetic engineering thermoplastic resins, and are a useful class of polymers having many beneficial properties. With their strength and clarity, polycarbonate resins offer many significant advantages and are used for a number of different commercial applications, including electronic engineering (E&E) parts, mechanical parts and so on.

Because of their broad use, it is desirable to provide polycarbonates having good flame retardance. The market is also moving towards articles having thin walls for purposes of slimness, weight reduction, and size reduction of the overall final product. With decreasing wall thickness, it becomes increasingly difficult to render the article flame retardant.

Desirably, polycarbonate compositions should also have good flow properties. Good flow properties reflect how easily the polymeric composition can be poured into a mold for forming the shape of the part. Better impact properties are also desirable. A conventional way of increasing impact resistance is by increasing the weight average molecular weight of the polymer, but this typically also reduces the flow properties and makes it difficult to fill complex or thin-walled molds.

There remains a need in the art for flame retardant polycarbonate compositions that have a dark color, provide good electrical tracking resistance, and maintain ductility at low temperatures. In this regard, polycarbonates exhibiting good flame retardance, low temperature impact strength, and flame retardance performance have been developed. However, these polycarbonates also require brominated fire retardant additives and are only available in light colors due to the presence of high $TiO_2$ content (for impact strength and tracking resistance). Prior attempts to create dark colored polycarbonates with thin wall flame retardant properties, non-brominated FR additives, and low temperature impact strength were unsuccessful, as the presence of higher levels of carbon black and/or lower levels of $TiO_2$ led to a loss in low temperature impact and electrical tracking resistance.

BRIEF DESCRIPTION

Disclosed herein are polycarbonate blends which have a combination of low temperature impact resistance (measured via ductility), thin wall FR performance (V0 at 0.8 mm thickness), and good electrical tracking resistance (e.g. CTI Class 2 rating). The blends include a polycarbonate polymer, a polycarbonate-polysiloxane copolymer, a non-brominated and non-chlorinated flame retardant, titanium dioxide ($TiO_2$), and carbon black.

Disclosed herein in various embodiments is a flame-retardant polycarbonate blend, comprising: from about 30 wt % to about 80 wt % of a polycarbonate polymer; a polycarbonate-polysiloxane copolymer in an amount such that the blend contains from about 2 wt % to about 5 wt % of siloxane; from about 0.01 wt % to about 0.05 wt % of a non-brominated and non-chlorinated flame retardant; from about 1 wt % to about 10 wt % of titanium dioxide ($TiO_2$); and from about 0.2 wt % to about 2 wt % of carbon black; wherein the ratio of $TiO_2$ to carbon black is from about 3:1 to about 6:1; and wherein the blend has an L-value of 20 or less.

In some embodiments, the polycarbonate blend has an L-value of 20 or less; meets CTI PLC 2 standards; has V0 performance at 0.8 mm thickness; and has 100% ductility at −30° C.

In other additional embodiments, the polycarbonate blend has an MVR of 10 $cm^3$/10 min or lower when measured at 300° C., 1.2 kg according to ISO 1133.

Sometimes, the polycarbonate blend has a notched Izod impact strength at −30° C. of at least 45 $kJ/m^2$ when measured according to ISO 180.

In particular embodiments, the blend has an L-value of 20 or less; meets CTI PLC 2 standards; has V0 performance at 0.8 mm thickness; has 100% ductility at −30° C.; and has a notched Izod impact strength at −30° C. of at least 45 $kJ/m^2$ when measured according to ISO 180.

The polycarbonate blend can have a pFTP(V0) of at least 0.90 and a flame out time (FOT) of about 30 seconds or less at 0.8 mm thickness. In more specific embodiments, the blend has a pFTP(V0) of at least 0.95 and a flame out time (FOT) of about 25 seconds or less at 0.8 mm thickness.

In particular embodiments, the ratio of $TiO_2$ to carbon black in the blend is from about 4:1 to about 5:1, and wherein the blend meets CTI PLC 2 standards.

In other embodiments, the ratio of $TiO_2$ to carbon black in the blend is at least 4:1, and the blend has 100% ductility at −30° C.

The ratio of $TiO_2$ to carbon black can be from about 4:1 to about 6:1, or can be from 4:1 to 5:1.

The polycarbonate blend may contain from about 2 wt % to about 5 wt % of $TiO_2$. The $TiO_2$ can have a silicon-based coating.

The polycarbonate blend may contain from about 0.5 wt % to about 1.5 wt % of carbon black.

The polycarbonate-polysiloxane copolymer can contain from about 6 wt % to about 20 wt % of siloxane.

In particular embodiments, the blend contains at least 0.03 wt % of the flame retardant. Specifically, the flame retardant can be a perfluoroalkane sulfonate.

The polycarbonate blend may further comprise from about 0.05 wt % to about 1 wt % of an anti-drip agent.

The polycarbonate polymer can comprise a high molecular weight polycarbonate polymer having a Mw above 25,000 and a low molecular weight polycarbonate polymer having a Mw below 25,000 which when blended together have an average molecular weight of from about 25,000 to about 30,000. The weight ratio of the high molecular weight polycarbonate polymer to the low molecular weight polycarbonate polymer can be about 1:1.

Also disclosed herein is a dark flame-retardant polycarbonate blend, comprising: from about 35 wt % to about 45 wt % of a high molecular weight polycarbonate polymer having a Mw above 25,000; from about 35 wt % to about 45 wt % of a low molecular weight polycarbonate polymer having a Mw below 25,000; a polycarbonate-polysiloxane copolymer in an amount such that the blend contains from about 2 wt % to about 5 wt % of siloxane; from about 0.01 wt % to about 0.05 wt % of a non-brominated and non-chlorinated flame retardant; from about 2 wt % to about 4 wt % of titanium dioxide ($TiO_2$); and from about 0.2 wt % to about 2 wt % of carbon black; wherein the blend has an L-value of 20 or less, meets CTI PLC 2 standards, has V0 performance at 0.8 mm thickness, and has 100% ductility at −30° C.

The ratio of $TiO_2$ to carbon black in the blend can be from about 3:1 to about 6:1. In particular embodiments, the polycarbonate blend has a notched Izod impact strength at −30° C. of at least 45 $kJ/m^2$ when measured according to ISO 180.

Also disclosed herein are articles molded from the various embodiments of the polycarbonate blend described above. The molded article can be a solar apparatus, an electrical junction box, an electrical connector, an electrical vehicle charger, an outdoor electrical enclosure, a smart meter enclosure, a smart grid power node, a photovoltaic frame, or a miniature circuit breaker.

These and other non-limiting characteristics are more particularly described below.

DETAILED DESCRIPTION

The present disclosure may be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

It should be noted that weight percentage or "wt %", is based on the total weight of the polymeric composition.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, hydroxymethyl ($—CH_2OH$), mercaptomethyl ($—CH_2SH$), methoxy, methoxycarbonyl ($CH_3OCO—$), nitromethyl ($—CH_2NO_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e. one or more hydrogen atoms is replaced) or unsubstituted. Exemplary alkyl groups include, but are not limited to, methyl, ethyl, and isopropyl. It should be noted that alkyl is a subset of aliphatic.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. Aromatic groups are not substituted. Exemplary aromatic groups include, but are not limited to, phenyl, pyridyl, furanyl, thienyl, naphthyl and biphenyl.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms). It should be noted that aryl is a subset of aromatic.

The term "cycloaliphatic" refers to an array of atoms which is cyclic but which is not aromatic. The cycloaliphatic group may include heteroatoms such as nitrogen, sulfur, selenium, silicon and oxygen in the ring, or may be composed exclusively of carbon and hydrogen. A cycloaliphatic group may comprise one or more noncyclic components. For example, a cyclohexylmethyl group ($C_6H_{11}CH_2—$) is a cycloaliphatic functionality, which comprises a cyclohexyl ring (the array of atoms which is cyclic but which is not aromatic) and a methylene group (the noncyclic component). Cycloaliphatic groups may be substituted or unsubstituted. Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "cycloalkyl" refers to an array of atoms which is cyclic but is not aromatic, and which is composed exclusively of carbon and hydrogen. Cycloalkyl groups may be substituted or unsubstituted. It should be noted that cycloalkyl is a subset of cycloaliphatic.

In the definitions above, the term "substituted" refers to at least one hydrogen atom on the named radical being substituted with another functional group, such as alkyl, halogen, —OH, —CN, $—NO_2$, —COOH, etc.

The term "perfluoroalkyl" refers to a linear or branched array of atoms that is composed exclusively of carbon and fluorine.

The term "room temperature" refers to a temperature of 23° C.

One method of measuring colors is the CIELAB color space. This color space uses three dimensions, L*, a*, and b*. L* is the lightness or L-value, and can be used as a measure of the amount of light transmission through the polycarbonate resin. The values for L* range from 0 (black) to 100 (diffuse white). The dimension a* is a measure of the color between magenta (positive values) and green (negative values). The dimension b* is a measure of the color between yellow (positive values) and blue (negative values), and may also be referred to as measuring the blueness of the color or as the b-value. Colors may be measured under DREOLL conditions.

The polycarbonate blends of the present disclosure include (A) at least one polycarbonate polymer; (B) a polycarbonate-polysiloxane copolymer; (C) a flame retardant additive that contains no bromine or chlorine; (D) titanium dioxide; (E) and carbon black. The resulting blends have a dark color (L-value of 20 or less) and a combination of desirable properties, specifically good tracking resistance, good thin-wall flame retardance (FR), and lower temperature impact resistance.

As used herein, the terms "polycarbonate" and "polycarbonate polymer" mean a polymer having repeating structural carbonate units of the formula (1):

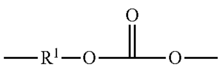

(1)

in which at least about 60 percent of the total number of $R^1$ groups are aromatic organic radicals and the balance thereof are aliphatic, alicyclic, or aromatic radicals. An ester unit (—COO—) is not considered a carbonate unit, and a carbonate unit is not considered an ester unit. In one embodiment, each $R^1$ is an aromatic organic radical, for example a radical of the formula (2):

$$-A^1-Y^1-A^2- \quad (2)$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —$S(O_2)$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

$$HO-A^1-Y^1-A^2-OH \quad (3)$$

wherein $Y^1$, $A^1$ and $A^2$ are as described above. Also included are bisphenol compounds of general formula (4):

(4)

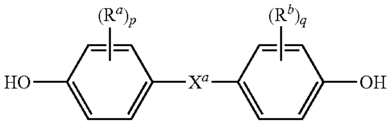

wherein $R^a$ and $R^b$ each represent a halogen atom or a monovalent hydrocarbon group and may be the same or different; p and q are each independently integers of 0 to 4; and $X^a$ represents one of the groups of formula (5):

(5)

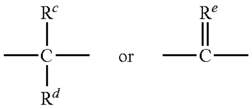

wherein $R^c$ and $R^d$ each independently represent a hydrogen atom or a monovalent linear or cyclic hydrocarbon group and $R^e$ is a divalent hydrocarbon group.

Specific examples of the types of bisphenol compounds that may be represented by formula (3) include 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, and 2-phenyl-3,3-bis(4-hydroxyphenyl) phthalimidine ("PPPBP"). Combinations comprising at least one of the foregoing dihydroxy compounds may also be used.

Branched polycarbonates are also useful, as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents may be added at a level of about 0.05 wt % to about 2.0 wt %.

"Polycarbonate" and "polycarbonate polymer" as used herein further includes blends of polycarbonates with other copolymers comprising carbonate chain units. An exemplary copolymer is a polyester carbonate, also known as a copolyester-polycarbonate. Such copolymers further contain, in addition to recurring carbonate chain units of the formula (1), repeating units of formula (6):

(6)

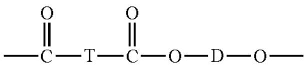

wherein D is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to about 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical. In other embodiments, dicarboxylic acids that contain a C4-C36 alkylene radical may be used to form copolymers of formula (6). Examples of such alkylene radicals include adipic acid, sebacic acid, or dodecanoic acid.

In one embodiment, D is a $C_{2-6}$ alkylene radical. In another embodiment, D is derived from an aromatic dihydroxy compound of formula (7):

(7)

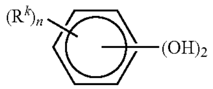

wherein each $R^k$ is independently a $C_{1-10}$ hydrocarbon group, and n is 0 to 4. The halogen is usually bromine. Examples of compounds that may be represented by the formula (7) include resorcinol, substituted resorcinol compounds such as 5-methyl resorcinol, 5-phenyl resorcinol, 5-cumyl resorcinol, or the like; catechol; hydroquinone; substituted hydroquinones such as 2-methyl hydroquinone, 2-t-butyl hydroquinone, 2-phenyl hydroquinone, 2-cumyl hydroquinone, 2,3,5,6-tetramethyl hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof.

In other embodiments, poly(alkylene terephthalates) may be used. Specific examples of suitable poly(alkylene terephthalates) are poly(ethylene terephthalate) (PET), poly (1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly (ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (8):

(8)

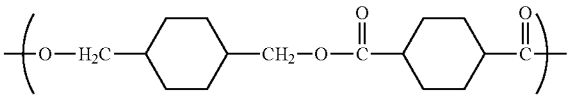

wherein, as described using formula (6), $R^2$ is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

In specific embodiments of the present disclosure, the polycarbonate polymer (A) is derived from a dihydroxy compound having the structure of Formula (I):

Formula (I)

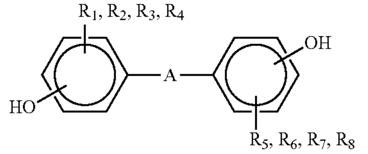

wherein $R_1$ through $R_8$ are each independently selected from hydrogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —$SO_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl) propane (i.e. bisphenol-A or BPA). Other illustrative compounds of Formula (I) include: 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl) cyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

In more specific embodiments, the polycarbonate polymer (A) is a bisphenol-A homopolymer. The polycarbonate polymer may have a weight average molecular weight (Mw) of from about 15,000 to about 70,000 daltons, according to polycarbonate standards, including a range of from about 15,000 to about 22,000 daltons. The polycarbonate polymer can be a linear or branched polycarbonate, and in more specific embodiments is a linear polycarbonate.

In some embodiments of the present disclosure, the polycarbonate composition includes two polycarbonate polymers, i.e. a first polycarbonate polymer (A1) and a second polycarbonate polymer (A2). The two polycarbonate polymers may have the same or different monomers.

The first polycarbonate polymer has a greater weight average molecular weight than the first polycarbonate polymer. The first polycarbonate polymer may have a weight average molecular weight of above 25,000 (measured by GPC based on BPA polycarbonate standards), including above 30,000. The second polycarbonate polymer may have a weight average molecular weight of below 25,000 (measured by GPC based on BPA polycarbonate standards). In embodiments, the weight ratio of the first polycarbonate polymer to the second polycarbonate polymer is usually at least 0.5:1, and in further embodiments is at least 1:1. Note the weight ratio described here is the ratio of the amounts of the two copolymers in the blend, not the ratio of the molecular weights of the two copolymers.

The weight ratio between the two polycarbonate polymers can affect the flow properties, ductility, and surface aesthetics of the final blend. The blends may include from about 30 to about 80 wt % of the first polycarbonate polymer and the second polycarbonate polymer. The blend may contain from about 35 to about 45 wt % of the first polycarbonate polymer. The blend may contain from about 35 to about 45 wt % of the second polycarbonate polymer. In specific embodiments, the blend contains from about 35 to about 40 wt % of the first polycarbonate polymer and from about 35 to about 40 wt % of the second polycarbonate polymer. When blended together, the two polycarbonate polymers can have an average molecular weight of from about 25,000 to about 30,000.

Suitable polycarbonates can be manufactured by processes known in the art, such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The polycarbonate compositions of the present disclosure also contain a polycarbonate-polysiloxane copolymer (B). This copolymer comprises polycarbonate blocks and polydiorganosiloxane blocks, also known as a polycarbonate-polysiloxane copolymer. The polycarbonate blocks in the copolymer comprise repeating structural units of formula (1) as described above, for example wherein $R^1$ is of formula (2) as described above. These units may be derived from reaction of dihydroxy compounds of formula (3) as described above.

The polydiorganosiloxane blocks comprise repeating structural units of formula (9) (sometimes referred to herein as 'siloxane'):

(9)

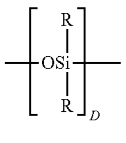

wherein each occurrence of R is same or different, and is a $C_{1-13}$ monovalent organic radical. For example, R may be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups may be used in the same copolymer. Generally, D may have an average value of 2 to about 1000, specifically about 2 to about 500, more specifically about 5 to about 200, and more specifically about 10 to about 75. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer. It should be noted that the siloxane blocks in a polycarbonate-polysiloxane copolymer have a distribution of chain lengths, and that D is an average value.

In one embodiment, the polydiorganosiloxane blocks are provided by repeating structural units of formula (10):

(10)

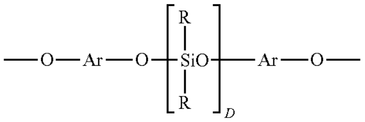

wherein D is as defined above; each R may be the same or different, and is as defined above; and Ar may be the same or different, and is a substituted or unsubstituted $C_6$-$C_{30}$ arylene radical, wherein the bonds are directly connected to an aromatic moiety. Suitable Ar groups in formula (10) may be derived from a $C_6$-$C_{30}$ dihydroxyarylene compound, for example a dihydroxyarylene compound of formula (3), (4), or (7) above. Combinations comprising at least one of the foregoing dihydroxyarylene compounds may also be used.

Such units may be derived from the corresponding dihydroxy compound of the following formula (11):

(11)

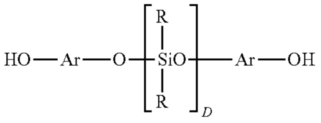

wherein Ar and D are as described above. Compounds of this formula may be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (12):

(12)

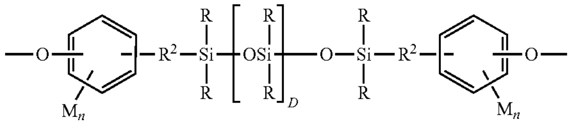

wherein R and D are as defined above. $R^2$ in formula (12) is a divalent $C_2$-$C_8$ aliphatic group. Each M in formula (12) may be the same or different, and may be cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl or tolyl. In another embodiment, R is methyl, or a mixture of methyl and phenyl. In still another embodiment, M is methoxy, n is one, $R^2$ is a divalent $C_1$-$C_3$ aliphatic group, and R is methyl.

These units may be derived from the corresponding dihydroxy polydiorganosiloxane (13):

(13)

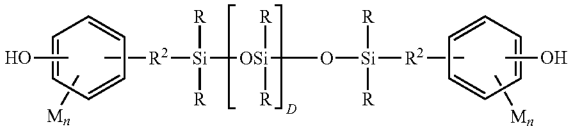

wherein R, D, M, $R^2$, and n are as described above.

Such dihydroxy polysiloxanes can be made by effecting a platinum catalyzed addition between a siloxane hydride of the formula (14), (14)

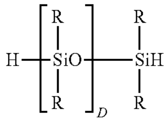

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methyl phenol and 2-allyl-4,6-dimethylphenol. Mixtures comprising at least one of the foregoing may also be used.

The siloxane blocks may make up from greater than zero to about 25 wt % of the polycarbonate-polysiloxane copolymer, including from 4 wt % to about 25 wt %, from about 4 wt % to about 10 wt %, or from about 15 wt % to about 25 wt %, or from about 6 wt % to about 20 wt %. The polycarbonate blocks may make up from about 75 wt % to less than 100 wt % of the block copolymer, including from about 75 wt % to about 85 wt %. It is specifically contemplated that the polycarbonate-polysiloxane copolymer is a diblock copolymer. The polycarbonate-polysiloxane copolymer may have a weight average molecular weight of from about 28,000 to about 32,000. Generally, the amount of the polycarbonate-polysiloxane copolymer is sufficient for the overall polycarbonate blend to contain from about 2 wt % to about 5 wt % of siloxane. For example, if the polycarbonate-polysiloxane copolymer contains 20 wt % of siloxane, the blend may contain from about 14 to about 24 wt % of the polycarbonate-polysiloxane copolymer.

The polycarbonate blends of the present disclosure also include a flame retardant additive (C) that preferably does not contain bromine or chlorine. The flame retardant additive (C) is present in the blend in an amount of from about 0.01 percent to about 0.05 percent by weight of the blend. More than one flame retardant additive may be present, i.e. combinations of such additives are contemplated.

In specific embodiments, the flame retardant additive is a perfluoroalkane sulfonate, such as potassium perfluorobutane sulfonate ("Rimar salt"). In this regard, it has been found that a common flame retardant additive, potassium diphenylsulfon-3-sulfonate ("KSS"), cannot be used to obtain a blend with the desired combination of properties.

The polycarbonate blends of the present disclosure also comprise titanium dioxide (D). The titanium dioxide has an average particle size of from about 30 nm to about 500 nm, including from about 100 nm to about 500 nm, or from about 150 nm to about 500 nm, or from about 100 nm to about 250 nm, or from about 150 nm to about 200 nm, or from about 30 nm to about 180 nm. In some embodiments, the titanium dioxide particles may be coated, for example with a silicon-based coating. The titanium dioxide may be present in the blends of the present disclosure in amounts of up to about 10 wt %, including from about 1 to about 10 wt %.

The polycarbonate blends of the present disclosure also comprise carbon black (E). The carbon black is used to impart a dark color to the blend. Generally, any kind of carbon black can be used. The carbon black is present in an amount of from about 0.2 wt % to about 2 wt % of the blend.

In particular embodiments, the blend also comprises an anti-drip agent (F). Anti-drip agents include, for example a fibril forming or non-fibril forming fluoropolymer such as polytetrafluoroethylene (PTFE). The anti-drip agent may be encapsulated by a rigid copolymer as described above, for example SAN. PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt % PTFE and about 50 wt % SAN, based on the total weight of the encapsulated fluoropolymer. The SAN may comprise, for example, about 75 wt % styrene and about 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. The anti-drip agent can be present in an amount of from about 0.05 wt % to about 1 wt % of the blend.

In embodiments, the polycarbonate blends of the present disclosure comprise from about 30 wt % to about 80 wt % of the polycarbonate polymer (A); polycarbonate-polysiloxane copolymer (B) sufficient to provide from about 2 wt % to about 5 wt % of siloxane in the blend; from about 0.01 wt % to about 0.05 wt % of the flame retardant additive (C) that contains no bromine or chlorine; from about 1 wt % to about 10 wt % of the titanium dioxide (D); and from about 0.2 wt % to about 2 wt % of the carbon black (E). It should be noted that the at least one polycarbonate polymer (A) may be a blend of two or more polycarbonate polymers having different weight average molecular weights, and the recited about 30 wt % to about 80 wt % refers to the total amount of such polycarbonate polymers (A) in the blend.

In more specific embodiments, the polycarbonate blend may comprise from at least 0.03 wt % to about 0.05 wt % of the flame retardant additive (C). In more specific embodiments, the polycarbonate blend may comprise from about 2 wt % to about 5 wt % of the titanium dioxide (D). In more specific embodiments, the polycarbonate blend may comprise from about 0.5 wt % to about 1.5 wt % of the carbon black (E). The polycarbonate blends of the present disclosure may have any combination of these amounts for these ingredients.

It was found that the ratio of $TiO_2$ to carbon black (w/w) was significant. In embodiments, the ratio of $TiO_2$ to carbon black is from about 3:1 to about 6:1, including from about 4:1 to about 5:1, or at least 4:1, or about 4:1, or from about 4:1 to about 6:1, or from 4:1 to 5:1.

The polycarbonate blends of the present disclosure have a combination of dark color, low temperature impact resistance, flame retardance at thin wall thicknesses, good tracking resistance, good impact strength, and good flow properties.

The polycarbonate blends of the present disclosure has an L-value of 20 or less, or in other words has a dark color. The L-value is measured according to DREOLL conditions in the CIELAB color space relative to CIE standard illuminant D50.

The polycarbonate blends of the present disclosure may have 100% ductility at −30° C., when measured according to ISO 180. This serves as a proxy for determining whether the material will shatter rather than bending or deforming.

The polycarbonate blends of the present disclosure may achieve V0 performance at a thickness of 0.8 mm, when measured according to UL94. In other embodiments, the polycarbonate blends have a specified pFTP and flame out time (FOT). These are discussed in the Examples herein. In some embodiments, the polycarbonate blends have a pFTP (V0) of at least 0.90 and a flame out time (FOT) of about 30 seconds or less. In other embodiments, the polycarbonate blends have a pFTP(V0) of at least 0.95 and a flame out time (FOT) of about 25 seconds or less.

The polycarbonate blends of the present disclosure may have a tracking resistance that meets CTI PLC 2 standards. CTI (Comparative Tracking Index) is used to define the tendency of an electrical insulating material to fail due to tracking. Tracking is the process that produces a partially conducting path of localized deterioration on the surface of an insulating material as a result of the action of electric discharges on or close to an insulation surface. Failure occurs by shorting. Electrical tracking in a plastic can be a source of fire in plastic parts that are used in electrical applications, so tracking resistance is often an important safety requirement for a plastic.

The standard for CTI is ASTM D3638. Briefly, under this standard a test piece having a thickness of 3 mm is provided. Two electrodes are attached to the test piece, and a voltage is applied. Drops of 0.1% ammonium chloride solution (volume 20 $mm^3$/drop) are applied between the electrodes, and the number of drops needed to cause tracking is counted. At each voltage, five specimens are tested, and the average number of drops is recorded. This procedure is repeated at four or more different voltages, and two data points should have more than 50 drops and two data points should have less than 50 drops. Then, a graph of the number of drops vs. voltage is plotted using those data points, and the voltage at which 50 drops causes tracking is extrapolated. If the extrapolated voltage is 250 volts or higher, then CTI PLC 2 standards have been met.

The standard test method described above can be somewhat long and cumbersome. A shorthand method is to apply a voltage of 250 volts and then continue to apply drops until tracking occurs. If 50 or more drops are needed to cause tracking, then this is a good sign that CTI PLC 2 standards will be met using the standard test method of ASTM D3638. For purposes of this application, CTI PLC 2 standards are considered to be met if either (i) the shorthand method is used and 50 or more drops are needed to cause tracking; or (ii) the standard test method of ASTM D3638 is followed.

The polycarbonate blends of the present disclosure may exhibit a notched Izod impact strength (INI) measured according to ISO 180 of at least 45 $kJ/m^2$, when measured at −30° C., 5.5 J hammer, and 3.0 mm thickness. In some embodiments, the notched Izod impact strength of the composition is at least 50 $kJ/m^2$.

The polycarbonate blends of the present disclosure may have a melt volume rate (MVR) of 10 cc/10 minutes or lower when measured according to ISO 1133 at 300° C. and a 1.2 kg load. The MVR may reach a minimum of about 6 cc/10 minutes. It should be noted that a higher MVR is desirable, and that polycarbonate blends having an MVR greater than 10 cc/10 min should also be considered within the scope of this disclosure.

The polycarbonate blends of the present disclosure may have any combination of these properties (dark color, FR performance, tracking resistance, INI, MVR), and any combination of the listed values for these properties. It should be noted that some of the properties (e.g. INI) are measured using articles made from the polycarbonate blend; however, such properties are described as belonging to the polycarbonate blend for ease of reference.

In some specific embodiments, the blend has a $TiO_2$: carbon black ratio of from about 3 to about 7; an L-value of 20 or less; meets CTI PLC 2 standards; has V0 performance at 0.8 mm thickness; and has 100% ductility at −30° C.

In some specific embodiments, the blend has a $TiO_2$: carbon black ratio of from about 3 to about 7; an L-value of 20 or less; and an MVR of 10 $cm^3$/10 min or lower when measured at 300° C., 1.2 kg according to ISO 1133.

In some specific embodiments, the blend has a $TiO_2$: carbon black ratio of from about 3 to about 7; an L-value of 20 or less; and a notched Izod impact strength at −30° C. of at least 45 $kJ/m^2$ when measured according to ISO 180.

In some specific embodiments, the blend has a $TiO_2$: carbon black ratio of from about 3 to about 7; an L-value of 20 or less; meets CTI PLC 2 standards; has V0 performance at 0.8 mm thickness; has 100% ductility at −30° C.; has an MVR of 10 $cm^3$/10 min or lower when measured at 300° C., 1.2 kg according to ISO 1133; and has a notched Izod impact strength at −30° C. of at least 45 $kJ/m^2$ when measured according to ISO 180.

In some specific embodiments, the blend has a $TiO_2$: carbon black ratio of from about 4 to about 5; an L-value of 20 or less; and meets CTI PLC 2 standards.

In some specific embodiments, the blend has a $TiO_2$: carbon black ratio of at least 4; an L-value of 20 or less; and 100% ductility at −30° C.

In some specific embodiments, the blend has an L-value of 20 or less, meets CTI PLC 2 standards, has V0 performance at 0.8 mm thickness, and has 100% ductility at −30° C.

In some specific embodiments, the blend has an L-value of 20 or less, meets CTI PLC 2 standards, has V0 performance at 0.8 mm thickness, has 100% ductility at −30° C., and an MVR of 10 $cm^3$/10 min or lower when measured at 300° C., 1.2 kg according to ISO 1133.

In some specific embodiments, the blend has an L-value of 20 or less, meets CTI PLC 2 standards, has V0 performance at 0.8 mm thickness, has 100% ductility at −30° C., and a notched Izod impact strength at −30° C. of at least 45 $kJ/m^2$ when measured according to ISO 180.

Other additives ordinarily incorporated in polycarbonate blends of this type can also be used, with the proviso that the additives are selected so as to not significantly adversely affect the desired properties of the polycarbonate. Combinations of additives can be used. Such additives can be mixed at a suitable time during the mixing of the components for forming the composition. In embodiments, one or more additives are selected from at least one of the following: UV stabilizing additives, thermal stabilizing additives, mold release agents, and gamma-stabilizing agents.

Exemplary antioxidant additives include, for example, organophosphites such as tris(nonyl phenyl)phosphite, tris (2,4-di-t-butylphenyl)phosphite (e.g., "IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 wt % of the overall polycarbonate composition.

Exemplary heat stabilizer additives include, for example, organophosphites such as triphenyl phosphite, tris-(2,6-dimethylphenyl)phosphite, tris-(mixed mono-and di-nonylphenyl)phosphite or the like; phosphonates such as dimethylbenzene phosphonate or the like, phosphates such as trimethyl phosphate, or the like, or combinations comprising at least one of the foregoing heat stabilizers. Heat stabilizers are generally used in amounts of 0.0001 to 1 wt % of the overall polycarbonate composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers are generally used in amounts of 0.0001 to 1 wt % of the overall polycarbonate composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1,3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl)oxy]-2,2-bis[[(2-cyano-3,3-diphenylacryloyl)oxy]methyl]propane (UVINUL® 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than or equal to 100 nanometers; or the like, or combinations comprising at least one of the foregoing UV absorbers. UV absorbers are generally used in amounts of 0.0001 to 1 wt % of the overall polycarbonate composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 wt %, specifically 0.01 to 0.75 wt %, more specifically 0.1 to 0.5 wt % of the overall polycarbonate composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH2OH) or it can be a member of a more complex hydrocarbon group such as $—CR^4HOH$ or $—CR^4OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 wt % of the overall polycarbonate composition.

The polycarbonate compositions of the present disclosure may be molded into pellets. The compositions may be molded, foamed, or extruded into various structures or articles by known methods, such as injection molding, overmolding, extrusion, rotational molding, blow molding and thermoforming.

In particular, it is contemplated that the polycarbonate compositions of the present disclosure are used to mold thin-wall articles, particularly for electrical application. Non-limiting examples of such articles include a solar apparatus, an electrical junction box, an electrical connector, an electrical vehicle charger, an outdoor electrical enclosure, a smart meter enclosure, a smart grid power node, a photovoltaic frame, and a miniature circuit breaker.

The present disclosure further contemplates additional fabrication operations on said articles, such as, but not limited to, molding, in-mold decoration, baking in a paint oven, lamination, and/or thermoforming. The polycarbonate compositions are especially useful for making articles that have parts with a wall thickness of 1.0 mm or less, or 0.8 mm or less. It is recognized that molded parts can have walls that vary in thickness, and these values refer to the thinnest parts of those walls, or the "thinnest thickness". Put another way, the article has at least one wall that is 1.0 mm/0.8 mm or less in thickness.

The following examples are provided to illustrate the polycarbonate blends of the present disclosure. The examples are merely illustrative and are not intended to limit the disclosure to the materials, conditions, or process parameters set forth therein.

EXAMPLES

Table 1 lists the names and descriptions of the ingredients used in the following Examples.

TABLE 1

| Ingredient | Description | Mw | Trade name | Source |
|---|---|---|---|---|
| PC 105 | Bisphenol-A homopolymer, Mw ~60,000, PDI 2.1-2.3 | 30,000-31,000 | LEXAN | SABIC Innovative Plastics |
| PC 175 | Bisphenol-A homopolymer, Mw ~20k-25k | 21,000-22,000 | LEXAN | SABIC Innovative Plastics |
| EXL | a BPA polycarbonate-polydimethylsiloxane copolymer comprising about 20% by weight of siloxane, 80% by weight of BPA, PCP (p-cumylphenol) endcapped, average siloxane chain length of ~35-55 | 30,000 | LEXAN | SABIC Innovative Plastics |
| KSS | Potassium diphenylsulphon-3-sulphonate | | KSS | Arichem LLC |
| Rimar | Potassium perfluorobutanesulfonate | | Bayowet C4 | Lanxess |
| TSAN | SAN encapsulated PTFE | | TSAN | SABIC Innovative Plastics |
| PETS | Pentaerythritol tetrastearate, >90% esterified, mold release agent | | PETS G | Faci |
| Phosphite | Tris(2,4-di-tert-butylphenyl)phosphite | | Irgafos 168 | Ciba |
| UVA 234 | | | TINUVIN 234 | Ciba |
| TiO2 | Titanium dioxide (coated) | | KRONOS 2233 | Kronos |
| CB | Carbon black | | Printex 85 | Degussa |

The melt volume rate (MVR) was measured using ISO 1133 at 300° C., 1.2 kg load. MVR is reported in cubic centimeters (cc) of polymer melt/10 minutes.

The notched Izod impact strength (INI) was measured using ISO 180, 5.5 J hammer, 23° C., and 3.0 mm thickness. INI was measured at 23° C. and at −30° C. to test for low temperature impact/ductility.

Flammability tests were performed following the procedure of Underwriter's Laboratory Bulletin 94 entitled "Tests for Flammability of Plastic Materials, UL94." According to this procedure, materials may be classified as V-0, V-1 or V-2 on the basis of the test results obtained for samples of a given thickness. It is assumed that a material that meets a given standard at a given thickness can also meet the same standard at greater thicknesses (e.g. a material that obtains V0 performance at 0.8 mm thickness can also obtain V0 performance at 1.0 mm thickness, 1.5 mm, etc.). The samples are made according to the UL94 test procedure. Samples were burned in a vertical orientation after aging for 48 hours at 23° C. At least 10 injection molded bars were burned for each UL test. The criteria for each of the flammability classifications tested are described below.

V0: In a sample placed so that its long axis is 180 degrees to the flame, the average period of flaming and/or smoldering after removing the igniting flame does not exceed five seconds and none of the vertically placed samples produces drips of burning particles that ignite absorbent cotton, and no specimen burns up to the holding clamp after flame or after glow. Five bars flame out time (FOT) is the sum of the flame out time for five bars each lit twice for ten (10) seconds each, for a maximum flame out time of 50 seconds. FOT1 is the average flame out time after the first light. FOT2 is the average flame out time after the second light.

V-1, V-2: In a sample placed so that its long axis is 180 degrees to the flame, the average period of flaming and/or smoldering after removing the igniting flame does not exceed twenty-five seconds and, for a V-1 rating, none of the vertically placed samples produces drips of burning particles that ignite absorbent cotton. The V2 standard is the same as V-1, except that flaming drips that ignite the cotton are permitted. Five bar flame out time (FOT) is the sum of the flame out time for five bars, each lit twice for ten (10) seconds each, for a maximum flame out time of 250 seconds.

The data was also analyzed by calculating the average flame out time, standard deviation of the flame out time and the total number of drips, and by using statistical methods to convert that data to a prediction of the probability of first time pass, or "p(FTP)", that a particular sample formulation would achieve a "pass" rating in the conventional UL94 V0 or V1 testing of 5 bars. The probability of a first time pass on a first submission (pFTP) may be determined according to the formula:

$$pFTP=(P_{t1>mbt,\ n=0} X P_{t2>mbt,\ n=0} X P_{total<=mtbt} X_{P\ drip,\ n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mtbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula: $P_{t1>mbt,\ n=0}=(1-P_{t1>mbt})^5$ where $P_{t1>mbt}$ is the area under the log normal distribution curve for t1>mbt, and where the exponent "5" relates to the number of bars tested. The probability that no second burn time exceeds a maximum burn time value may be determined from the formula: $P_{t2>mbt,\ n=0}=(1-P_{t2>mbt})$ where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds. The probability $P_{drip,\ n=0}$ that no specimen exhibits dripping during the flame test is an attribute function, estimated by: $(1-P_{drip})^5$ where $P_{drip}$=(the number of bars that drip/the number of bars tested).

The probability $P_{total<=mtbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mtbt}$ may be determined from the area under a log normal distribution curve of a set of 1000 Monte Carlo simulated 5-bar total burn time for total<=maximum total burn time. For the UL-94 V-0 rating, the maximum total burn time is 50 seconds. For a V-1 or V-2 rating, the maximum total burn time is 250 seconds.

Preferably, p(FTP) is as close to 1 as possible, for example, greater than or equal to about 0.80, or greater than or equal to about 0.90, or greater than or equal to about 0.95, for maximum flame-retardant performance in UL testing. These standards are more stringent than merely specifying compliance with the referenced V-0 or V-1 test.

For the CTI values reported in the Examples, drops of 0.1% ammonium chloride solution were applied, the voltage was maintained at 250V, and the number of drops needed to cause tracking was counted. The higher the number of drops, the higher the tracking resistance of the Example was. In order to meet CTI PLC 2 standards, the number of drops must be 50 or higher.

The processing conditions (extrusion, injection molding) were as follows:

| Extrusion Profile | |
|---|---|
| Temp. Feed zone (° C.) | 40 |
| Temp. zone 1 (° C.) | 200 |
| Temp. zone 2 (° C.) | 250 |
| Temp. zone 3 (° C.) | 270 |
| Temp. zone 4 (° C.) | 285 |
| Temp. zone 5 (° C.) | 285 |
| Temp. zone 6 (° C.) | 285 |
| Temp. zone 7 (° C.) | 285 |
| Temp. zone 8 (° C.) | 285 |
| Temp. zone 9 (° C.) | 285 |
| Temp. die (° C.) | — |
| Screw speed (rpm) | 300 |
| Vacuum (bar) | 0.7 |

| Injection Molding | ISO parts | UL bars |
|---|---|---|
| Drying time (hrs) | 2 | 2 |
| Drying temp (° C.) | 120 | 120 |
| Temp. hopper (° C.) | 40 | 40 |
| Temp. zone 1 | 280 | 270 |
| Temp. zone 2 | 290 | 280 |
| Temp. zone 3 | 300 | 290 |
| Temp. nozzle | 295 | 285 |
| Temp. mold | 90 | 70 |

First Set of Examples

Tables 1A and 1B shows the effect of using a special color package in combination with various flame retardance additives. Comparison of C. Ex. 1 and C. Ex. 2 shows that using a combination of 4% $TiO_2$ and 1% carbon black greatly improved the flame retardance (FR) performance, from a pFTP value of 0.00 to 0.91, while also providing a dark/black material with an L-value below 20. However, the CTI value was low (37, 34), likely due to the presence of KSS. Without using any KSS, as in C. Ex. 3, the CTI value was markedly higher at 63. However, the FR performance was not robust (pFTP<0.9).

When using a low level of Rimar, as in Ex. 4, both fire retardance and CTI were relatively high (0.92 and 55, respectively) and a low L-value was retained. As shown in Ex. 5, increased TSAN provided slightly higher fire retardance (pFTP=0.96) and a higher CTI value (64). Lowering the EXL levels, as in Ex. 6, still provided V0 flame retardance, but less robustly (pFTP<0.9). Lowering EXL even further lowered flame retardance robustness and reduced ductility at −30° C. In conclusion, flame retardance robustness could be improved by using higher Rimar and TSAN levels, but low temperature impact was still poor.

TABLE 1A

| Ingredient | Units | C. Ex. 1 | C. Ex. 2 | C. Ex. 3 | Ex. 4 | Ex. 5 |
|---|---|---|---|---|---|---|
| PC 105 | % | 38.25 | 35.75 | 35.9 | 35.89 | 35.74 |
| PC 175 | % | 38.26 | 35.76 | 35.91 | 35.89 | 35.74 |
| EXL | % | 22.2 | 22.2 | 22.2 | 22.2 | 22.2 |
| KSS | % | 0.3 | 0.3 | — | — | — |
| Rimar | % | — | — | — | 0.03 | 0.03 |
| TSAN | % | 0.3 | 0.3 | 0.3 | 0.3 | 0.6 |
| PETS | % | 0.3 | 0.3 | 0.3 | 0.3 | 0.3 |
| Phosphite | % | 0.09 | 0.09 | 0.09 | 0.09 | 0.09 |
| UVA 234 | % | 0.3 | 0.3 | 0.3 | 0.3 | 0.3 |
| $TiO_2$ | % | | 4 | 4 | 4 | 4 |
| Carbon black | % | | 1 | 1 | 1 | 1 |
| Ratio $TiO_2$/CB | | | 4.0 | 4.0 | 4.0 | 4.0 |
| MVR | cc/10 min | 7.9 | 7.3 | 7.0 | 7.6 | 7.4 |

TABLE 1A-continued

| Ingredient | Units | C. Ex. 1 | C. Ex. 2 | C. Ex. 3 | Ex. 4 | Ex. 5 |
|---|---|---|---|---|---|---|
| INI, 23° C. | $kJ/m^2$ | 77 | 70 | 70 | 69 | 71 |
| INI, −30° C. | $kJ/m^2$ | 63 | 57 | 54 | 52 | 56 |
| Ductility, 23° C. | % | 100 | 100 | 100 | 100 | 100 |
| Ductility, −30° C. | % | 100 | 100 | 100 | 100 | 100 |
| FOT | sec | 71 | 34 | 38 | 25 | 23 |
| p(FTP) | — | 0.00 | 0.91 | 0.54 | 0.92 | 0.96 |
| V-rating | — | V2/V1 | V0 | V1/V0 | V0 | V0 |
| CTI, 250V | drops | 37 | 34 | 63 | 55 | 64 |
| L-value | — | 84.9 | 18.5 | 18.8 | 18.5 | 18.4 |

TABLE 1B

| Ingredient | Units | Ex. 6 | C. Ex. 7 | C. Ex. 8 | C. Ex. 9 |
|---|---|---|---|---|---|
| PC 105 | % | 39.49 | 6 | 6 | 6 |
| PC 175 | % | 39.49 | 73.94 | 73.895 | 73.695 |
| EXL | % | 15 | 14 | 14 | 14 |
| KSS | % | — | — | — | — |
| Rimar | % | 0.03 | 0.03 | 0.075 | 0.075 |
| TSAN | % | 0.3 | 0.4 | 0.4 | 0.6 |
| PETS | % | 0.3 | 0.3 | 0.3 | 0.3 |
| Phosphite | % | 0.09 | 0.03 | 0.03 | 0.03 |

TABLE 1B-continued

| Ingredient | Units | Ex. 6 | C. Ex. 7 | C. Ex. 8 | C. Ex. 9 |
|---|---|---|---|---|---|
| UVA 234 | % | 0.3 | 0.3 | 0.3 | 0.3 |
| $TiO_2$ | % | 4 | 4 | 4 | 4 |
| Carbon black | % | 1 | 1 | 1 | 1 |
| Ratio $TiO_2$/CB | | 4.0 | 4.0 | 4.0 | 4.0 |
| MVR | cc/10 min | 9.3 | 15.4 | 14.7 | 14.7 |
| INI, 23° C. | $kJ/m^2$ | 72 | 63 | 61 | 65 |
| INI, −30° C. | $kJ/m^2$ | 50 | 26 | 23 | 25 |
| Ductility, 23° C. | % | 100 | 100 | 100 | 100 |
| Ductility, −30° C. | % | 100 | 0 | 0 | 0 |
| FOT | sec | 31 | 35 | 35 | 36 |
| p(FTP) | — | 0.87 | 0.66 | 0.71 | 0.93 |
| V-rating | — | V2/V1 | V0 | V1/V0 | V0 |
| CTI, 250V | drops | 57 | 62 | 45 | 58 |
| L-value | — | 18.7 | 18.2 | 18.6 | 19.0 |

Second Set of Examples

Tables 2A-2C shows the results of varying the levels of EXL, Rimar, $TiO_2$, and carbon black (CB). If the EXL level is low, both the low temperature ductility and the V-rating are poor. If the ratio of $TiO_2$:CB is too low, then the impact strength and/or the CTI are poor. With a high $TiO_2$:CB ratio, the L-value is greater than 20 and flame retardance is not robust (reflected in low pFTP and lower V-rating).

TABLE 2A

| Ingredient | Units | #1 | #2 | #3 | #4 | #5 | #6 | #7 |
|---|---|---|---|---|---|---|---|---|
| PC 105 | % | 42.02 | 36.25 | 43.27 | 39.885 | 41.25 | 37 | 36.77 |
| PC 175 | % | 42.02 | 36.25 | 43.27 | 39.885 | 41.25 | 37 | 36.77 |
| EXL | % | 10 | 22.5 | 10 | 16.25 | 10 | 22.5 | 22.5 |
| Rimar | % | 0.01 | 0.05 | 0.01 | 0.03 | 0.05 | 0.05 | 0.01 |
| TSAN | % | 0.3 | 0.3 | 0.3 | 0.3 | 0.3 | 0.3 | 0.3 |
| PETS | % | 0.3 | 0.3 | 0.3 | 0.3 | 0.3 | 0.3 | 0.3 |
| Phosphite | % | 0.05 | 0.05 | 0.05 | 0.05 | 0.05 | 0.05 | 0.05 |
| UVA 234 | % | 0.3 | 0.3 | 0.3 | 0.3 | 0.3 | 0.3 | 0.3 |
| $TiO_2$ | % | 3.5 | 3.5 | 2 | 2 | 5 | 2 | 2 |
| Carbon black | % | 1.5 | 0.5 | 0.5 | 1 | 1.5 | 0.5 | 1 |
| Ratio $TiO_2$/CB | | 2.3 | 7.0 | 4.0 | 2.0 | 3.3 | 4.0 | 2.0 |
| MVR | cc/10 min | 9.0 | 8.7 | 10.0 | 9.4 | 9.9 | 8.5 | 7.5 |
| INI, 23° C. | $kJ/m^2$ | 69 | 70 | 74 | 74 | 67 | 74 | 73 |
| INI, −30° C. | $kJ/m^2$ | 25 | 65 | 49 | 55 | 23 | 65 | 62 |
| Ductility, 23° C. | % | 100 | 100 | 100 | 100 | 100 | 100 | 100 |
| Ductility, −30° C. | % | 0 | 100 | 40 | 100 | 0 | 100 | 100 |
| Tbd | ° C. | −15 | −50 | −30 | −35 | −10 | −50 | −50 |
| FOT | sec | 69 | 35 | 67 | 35 | 65 | 28 | 18 |
| p(FTP) | — | 0.01 | 0.82 | 0.01 | 0.70 | 0.02 | 0.87 | 1.00 |
| V-rating | — | V1 | V0 | V1 | V0 | V1 | V0 | V0 |
| CTI, 250V | drops | — | — | — | — | — | — | — |
| L-value | — | 12.4 | 22.6 | 16.4 | 12.0 | 15.0 | 17.6 | 12.3 |

TABLE 2B

| Ingredient | Units | #8 | #9 | #10 | #11 | #12 | #13 | #14 |
|---|---|---|---|---|---|---|---|---|
| PC 105 | % | 36.27 | 36.51 | 36.27 | 38.385 | 35.5 | 35.75 | 42.75 |
| PC 175 | % | 36.27 | 36.51 | 36.27 | 38.385 | 35.5 | 35.75 | 42.75 |
| EXL | % | 22.5 | 22.5 | 22.5 | 16.25 | 22.5 | 22.5 | 10 |
| Rimar | % | 0.01 | 0.03 | 0.01 | 0.03 | 0.05 | 0.05 | 0.05 |
| TSAN | % | 0.3 | 0.3 | 0.3 | 0.3 | 0.3 | 0.3 | 0.3 |
| PETS | % | 0.3 | 0.3 | 0.3 | 0.3 | 0.3 | 0.3 | 0.3 |
| Phosphite | % | 0.05 | 0.05 | 0.05 | 0.05 | 0.05 | 0.05 | 0.05 |
| UVA 234 | % | 0.3 | 0.3 | 0.3 | 0.3 | 0.3 | 0.3 | 0.3 |
| $TiO_2$ | % | 3.5 | 2 | 3.5 | 5 | 5 | 3.5 | 2 |
| Carbon black | % | 0.5 | 1.5 | 0.5 | 1 | 0.5 | 1.5 | 1.5 |
| Ratio $TiO_2$/CB | | 7.0 | 1.3 | 7.0 | 5.0 | 10.0 | 2.3 | 1.3 |
| MVR | cc/10 min | 7.8 | 7.4 | 7.9 | 8.8 | 9.3 | 8.0 | 9.9 |
| INI, 23° C. | $kJ/m^2$ | 70 | 74 | 70 | 69 | 68 | 68 | 73 |
| INI, −30° C. | $kJ/m^2$ | 63 | 58 | 63 | 52 | 51 | 51 | 20 |

TABLE 2B-continued

| Ingredient | Units | #8 | #9 | #10 | #11 | #12 | #13 | #14 |
|---|---|---|---|---|---|---|---|---|
| Ductility, 23° C. | % | 100 | 100 | 100 | 100 | 100 | 100 | 100 |
| Ductility, −30° C. | % | 100 | 100 | 100 | 100 | 100 | 100 | 0 |
| Tbd | ° C. | −50 | −35 | −50 | −35 | −50 | −35 | −10 |
| FOT | sec | 54 | 21 | 50 | 26 | 39 | 31 | 43 |
| p(FTP) | — | 0.03 | 0.98 | 0.17 | 0.91 | 0.43 | 0.76 | 0.29 |
| V-rating | — | V1 | V0 | V1 | V0 | V2/V0 | V1/V0 | V1/V0 |
| CTI, 250V | drops | — | — | — | — | — | — | — |
| L-value | — | 22.4 | 10.5 | 22.6 | 18.8 | 27.0 | 12.8 | 9.7 |

TABLE 2C

| Ingredient | Units | #15 | #16 | #17 | #18 | #19 | #20 |
|---|---|---|---|---|---|---|---|
| PC 105 | % | 42.5 | 41.77 | 39.645 | 42.26 | 35.02 | 35.76 |
| PC 175 | % | 42.5 | 41.77 | 39.645 | 42.26 | 35.02 | 35.76 |
| EXL | % | 10 | 10 | 16.25 | 10 | 22.5 | 22.5 |
| Rimar | % | 0.05 | 0.01 | 0.01 | 0.03 | 0.01 | 0.03 |
| TSAN | % | 0.3 | 0.3 | 0.3 | 0.3 | 0.3 | 0.3 |
| PETS | % | 0.3 | 0.3 | 0.3 | 0.3 | 0.3 | 0.3 |
| Phosphite | % | 0.05 | 0.05 | 0.05 | 0.05 | 0.05 | 0.05 |
| UVA 234 | % | 0.3 | 0.3 | 0.3 | 0.3 | 0.3 | 0.3 |
| $TiO_2$ | % | 3.5 | 5 | 2 | 3.5 | 5 | 4 |
| Carbon black | % | 0.5 | 0.5 | 1.5 | 1 | 1.5 | 1 |
| Ratio $TiO_2$/CB | | 7.0 | 10.0 | 1.3 | 3.5 | 3.3 | 4.0 |
| MVR | cc/10 min | 10.2 | 9.7 | 9.0 | 9.6 | 7.4 | 8.0 |
| INI, 23° C. | $kJ/m^2$ | 69 | 70 | 73 | 71 | 68 | 71 |
| INI, −30° C. | $kJ/m^2$ | 38 | 41 | 27 | 28 | 51 | 57 |
| Ductility, 23° C. | % | 100 | 100 | 100 | 100 | 100 | 100 |
| Ductility, −30° C. | % | 0 | 0 | 0 | 0 | 100 | 100 |
| Tbd | ° C. | −25 | −25 | −25 | −25 | −35 | −45 |
| FOT | sec | 46 | 117 | 20 | 54 | 27 | 23 |
| p(FTP) | — | 0.23 | 0.00 | 1.00 | 0.07 | 0.76 | 1.00 |
| V-rating | — | V2/V1 | V1 | V0 | V2/V0 | V0 | V0 |
| CTI, 250V | drops | — | — | — | — | — | — |
| L-value | — | 21.9 | 25.7 | 10.1 | 15.2 | 15.7 | 17.0 |

The results of Table 2 may be expressed with the following transfer functions. These functions show the relation between the different composition ingredients and the exhibited properties of the resulting polycarbonate materials:

INI at −30° C. ($R^2$=0.92): $[INI]^{2.3}$=1423+672*% EXL−4784*% CB [$kJ/m^2$]

Brittle-ductile transition ($R^2$=0.99): Tbd=−3.4−1.86*% EXL+48.4*% Rimar−21.4*% CB+18.1*$[\% CB]^2$[° C.]

0.8 mm Flame Out Time (FOT) ($R^2$=0.85): log 10[FOT]=2.71−0.0227*% EXL−8.38*% Rimar+0.0509*% $TiO_2$−1.59*% CB+6.99*% Rimar*% CB+0.603*$[\% CB]^2$ 0.8 mm V0 pFTP ($R^2$=0.89): SQRT[pFTP]=−2.13+0.304*% EXL+16.2*% Rimar−0.0596*% $TiO_2$−0.0612*% CB+0.0319*% EXL*% CB−9.68*% Rimar*% CB−0.00899*$[\% EXL]^2$ L-value ($R^2$=0.99): 1000/L=53.0−0.256*% EXL−5.27*% TiO2+49.3*% CB−4.27*% TiO2*% CB.

Third Set of Examples

Tables 3A-3B shows the results of further varying the levels of EXL, Rimar, $TiO_2$ and carbon black (CB). A low $TiO_2$:CB ratio results in poor ductility, as seen in C.Ex. 2 and 3. This effect is magnified when the EXL level is also somewhat lower.

Surprisingly, as long as the $TiO_2$:CB ratio is around 4 and EXL and Rimar are present, all properties (flame retardance, CTI tracking resistance, Color) are within a desirable range. Comparison of Ex. 4 and Ex. 5 reveals that no differences are seen if the total color package is reduced, but the ratio is kept equal. Flame retardance is robust even when levels of Rimar and/or TSAN are reduced. Ex. 9 shows that reduction of 50% in all additives (Rimar, TSAN, $TiO_2$, CB) does not affect flame retardance or CTI tracking resistance. As seen in Ex. 10, at a ratio of 4, flame retardance and CTI tracking resistance are relatively higher, while a higher ratio (C.Ex.11) results in an undesirable L-value greater than 20.

TABLE 3A

| Ingredient | Units | Ex. 1 | C. Ex. 2 | C. Ex. 3 | Ex. 4 | Ex. 5 |
|---|---|---|---|---|---|---|
| PC 105 | % | 35.755 | 35.505 | 37.855 | 35.7675 | 35.905 |
| PC 175 | % | 35.55 | 35.505 | 37.855 | 35.7675 | 35.905 |
| EXL | % | 22.2 | 22.2 | 17.5 | 22.2 | 22.2 |
| Rimar | % | 0.03 | 0.03 | 0.03 | 0.015 | 0.03 |
| TSAN | % | 0.6 | 0.6 | 0.6 | 0.6 | 0.3 |
| PETS | % | 0.3 | 0.3 | 0.3 | 0.3 | 0.3 |
| Phosphite | % | 0.06 | 0.06 | 0.06 | 0.05 | 0.06 |
| UVA 234 | % | 0.3 | 0.3 | 0.3 | 0.3 | 0.3 |
| $TiO_2$ | % | 4 | 4 | 4 | 4 | 4 |
| Carbon black | % | 1 | 1.5 | 1.5 | 1 | 1 |
| Ratio $TiO_2$/CB | | 4.0 | 2.7 | 2.7 | 4.0 | 4.0 |
| MVR | cc/10 min | 7.4 | 7.0 | 7.5 | — | 7.3 |
| INI, 23° C. | $kJ/m^2$ | 71 | 70 | 69 | — | 69 |
| INI, −30° C. | $kJ/m^2$ | 56 | 34 | 24 | — | 45 |
| Ductility, 23° C. | % | 100 | 100 | 100 | — | 100 |
| Ductility, −30° C. | % | 100 | 60 | 0 | — | 100 |
| FOT | sec | 23 | 25 | 25 | 19.8 | 21.9 |
| p(FTP) | — | 0.96 | 0.87 | 0.94 | 0.99 | 0.97 |
| V-rating | — | V0 | V0 | V0 | V0 | V0 |

TABLE 3A-continued

| Ingredient | Units | Ex. 1 | C. Ex. 2 | C. Ex. 3 | Ex. 4 | Ex. 5 |
|---|---|---|---|---|---|---|
| CTI, 250V | drops | 64 | — | — | — | 52 |
| L-value | — | 18.4 | 13.1 | 14.3 | 16.5 | 16.5 |

TABLE 3B

| Ingredient | Units | Ex. 6 | Ex. 7 | Ex. 8 | Ex. 9 | Ex. 10 | C. Ex. 11 |
|---|---|---|---|---|---|---|---|
| PC 105 | % | 37.155 | 36.323 | 36.6045 | 37.1675 | 35.923 | 36.01 |
| PC 175 | % | 37.155 | 36.323 | 36.6045 | 37.1675 | 35.923 | 36.01 |
| EXL | % | 22.2 | 22.2 | 22.2 | 22.2 | 22.2 | 22.2 |
| Rimar | % | 0.03 | 0.024 | 0.021 | 0.015 | 0.024 | 0.03 |
| TSAN | % | 0.3 | 0.48 | 0.42 | 0.3 | 0.48 | 0.6 |
| PETS | % | 0.3 | 0.3 | 0.3 | 0.3 | 0.3 | 0.3 |
| Phosphite | % | 0.06 | 0.05 | 0.05 | 0.05 | 0.05 | 0.05 |
| UVA 234 | % | 0.3 | 0.3 | 0.3 | 0.3 | 0.3 | 0.3 |
| $TiO_2$ | % | 2 | 3.2 | 2.8 | 2 | 4 | 4 |
| Carbon black | % | 0.5 | 0.8 | 0.7 | 0.5 | 0.8 | 0.5 |
| Ratio $TiO_2$/CB | | 4.0 | 4.0 | 4.0 | 4.0 | 5.0 | 8.0 |
| MVR | cc/10 min | 7.4 | — | — | — | — | — |
| INI, 23° C. | kJ/$m^2$ | 73 | — | — | — | — | — |
| INI, −30° C. | kJ/$m^2$ | 53 | — | — | — | — | — |
| Ductility, 23° C. | % | 100 | — | — | — | — | — |
| Ductility, −30° C. | % | 100 | — | — | — | — | — |
| FOT | sec | 27.3 | 22.2 | 16.4 | 22.7 | 25.5 | 23.8 |
| p(FTP) | — | 0.95 | 0.97 | 1.00 | 0.97 | 0.93 | 0.97 |
| V-rating | — | V0 | V0 | V0 | V0 | V0 | V0 |
| CTI, 250V | drops | 54 | 71 | 61 | 53 | — | 60 |
| L-value | — | — | 16.4 | 16.4 | 16.6 | 18.7 | 23.4 |

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A flame-retardant polycarbonate blend, comprising:

from about 30 wt % to about 80 wt % of a blend of a high molecular weight polycarbonate polymer having a Mw above 25,000 and a low molecular weight polycarbonate polymer having a Mw below 25,000 which when blended together have an average molecular weight from about 25,000 to about 30,000:

a polycarbonate-polysiloxane copolymer in an amount such that the blend contains from about 2 wt % to about 5 wt % of siloxane, wherein the polycarbonate-polysiloxane copolymer is different from the high molecular weight polycarbonate polymer and the low molecular weight polycarbonate polymer;

from about 0.01 wt % to about 0.05 wt % of a non-brominated and non-chlorinated flame retardant;

from about 1 wt % to about 10 wt % of titanium dioxide (TiO2); and from about 0.2 wt % to about 2 wt % of carbon black;

wherein the ratio of $TiO_2$ to carbon black is from about 4:1 to about 6:1; and wherein the blend has an L-value of 20 or less; meets CTI PLC 2 standards when measured according to ASTM D3638; has V0 performance at 0.08 mm thickness; and has 100% ductility at −30° C.

2. The polycarbonate blend of claim 1, wherein the blend also has an MVR of 10 $cm^3$/10 min or lower when measured at 300° C., 1.2 kg according to ISO 1133.

3. The polycarbonate blend of claim 1, wherein the blend has a notched Izod impact strength at −30° C. of at least 45 kJ/$m^2$ when measured according to ISO 180.

4. The polycarbonate blend of claim 1, wherein the blend has a pFTP(V0) of at least 0.90 and a frame out time (FOT) of about 30 seconds or less at 0.8 mm thickness.

5. The polycarbonate blend of claim 1, wherein the blend has a pFTP(V0) of at least 0.95 and a flame out time (FOT) of about 25 seconds or less at 0.8 mm thickness.

6. The polycarbonate blend of claim 1, wherein the ratio of $TiO_2$ to carbon black in the blend is from about 4:1 to 5:1, and wherein the blend meets CTI PLC 2 standards.

7. The polycarbonate blend of claim 1, wherein the ratio of $TiO_2$ to carbon black in the blend is at least 4:1, and the blend has 100% ductility at −30° C.

8. The polycarbonate blend of claim 1, wherein the ratio of $TiO_2$ to carbon black is from 4:1 to 5:1.

9. The polycarbonate blend of claim 1, wherein the blend contains from about 2 wt % to about 5 wt % of $TiO_2$.

10. The polycarbonate blend of claim 1, wherein the $TiO_2$ has a silicon-based coating.

11. The polycarbonate blend of claim 1, wherein the blend contains from about 0.5 wt % to about 1.5 wt % of carbon black.

12. The polycarbonate blend of claim 1, wherein the polycarbonate-polysiloxane copolymer contains from about 6 wt % to about 20 wt % of siloxane.

13. The polycarbonate blend of claim 1, wherein the blend contains at least 0.03 wt % of the flame retardant.

14. The polycarbonate blend of claim 1, wherein the flame retardant is a perfluoroalkane sulfonate.

15. The polycarbonate blend of claim 1, further comprising from about 0.05 wt % to about 1 wt % of an anti-drip agent.

16. The polycarbonate blend of claim 1, wherein the weight ratio of the high molecular weight polycarbonate polymer to the low molecular weight polycarbonate polymer is about 1:1.

17. A dark flame-retardant polycarbonate blend, comprising:

from about 35 wt % to about 45 wt % of a high molecular weight polycarbonate polymer having a Mw above 25,000;

from about 35 wt % to about 45% wt % of a low molecular weight polycarbonate polymer having a Mw below 25,000;

a polycarbonate-polysiloxane copolymer in an amount such that the blend contains from about 2 wt % to about 5 wt % of siloxane, wherein the polycarbonate-polysiloxane copolymer is different from the high molecular weight polycarbonate polymer and the low molecular weight polycarbonate polymer;

from about 0.01 wt % to about 0.05 wt % of a non-brominated and non-chlorinated flame retardant;

from about 2 wt % to about 4 wt % of titanium dioxide ($TiO_2$); and from about 0.2 wt % to about 2 wt % of carbon black; wherein the ratio of $TiO_2$ to carbon black is about 4:1 to about 6:1;

wherein the blend has an L-value of 20 or less, meets CTI PLC 2 standards when measured according to ASTM D3638, has V0 performance at 0.8 mm thickness, and has 100% ductility at −30° C.

18. The polycarbonate blend of claim 17, wherein the blend has a notched Izod impact strength at −30° C. of at least 45 $kJ/m^2$ when measured according to ISO 180.

19. An article molded from the polycarbonate blend of claim 1.

20. The molded article of claim 19, wherein the article is a solar apparatus, an electrical junction box, an electrical connector, an electrical vehicle charger, an outdoor electrical enclosure, a smart meter enclosure, a smart grid power node, a photovoltaic frame, or a miniature circuit breaker.

* * * * *